US012603750B2

(12) United States Patent
Hidaka et al.

(10) Patent No.: US 12,603,750 B2
(45) Date of Patent: Apr. 14, 2026

(54) DUAL PATH CLOCK FORWARDING

(71) Applicant: Credo Technology Group Limited, Grand Cayman (KY)

(72) Inventors: Yasuo Hidaka, Los Gatos, CA (US); Junqing Sun, Cupertino, CA (US)

(73) Assignee: Credo Technology Group Limited, Grand Cayman (KY)

( * ) Notice: Subject to any disclaimer, the term of this patent is extended or adjusted under 35 U.S.C. 154(b) by 56 days.

(21) Appl. No.: 18/628,354

(22) Filed: Apr. 5, 2024

(65) Prior Publication Data

US 2025/0274259 A1    Aug. 28, 2025

Related U.S. Application Data

(60) Provisional application No. 63/558,762, filed on Feb. 28, 2024.

(51) Int. Cl.
H04L 7/00        (2006.01)
H04L 7/033       (2006.01)

(52) U.S. Cl.
CPC ............ H04L 7/0008 (2013.01); H04L 7/033 (2013.01)

(58) Field of Classification Search
None
See application file for complete search history.

(56) References Cited

U.S. PATENT DOCUMENTS

| | | | | |
|---|---|---|---|---|
| 8,050,373 B2 * | 11/2011 | Buchwald | .............. | H04L 25/20 |
| | | | | 375/376 |
| 10,447,509 B1 | 10/2019 | Cai et al. | | |
| 10,892,763 B1 * | 1/2021 | Hidaka | ................. | H03L 7/0807 |
| 11,038,602 B1 * | 6/2021 | Sun | ........................ | H04B 17/21 |
| 11,424,968 B1 * | 8/2022 | Sun | ..................... | H04L 25/4908 |
| 11,489,657 B1 * | 11/2022 | Lin | ........................ | H03L 7/0814 |

OTHER PUBLICATIONS

U.S. Appl. No. 18/062,382 as filed in U.S. Patent and Trademark Office on Jun. 12, 2022 by inventors Kyasuo Hidaka and Junqing Phil Sun, titled: "Clock Recovery With Loop Delay Cancellation".

(Continued)

*Primary Examiner* — Kim Huynh
(74) *Attorney, Agent, or Firm* — RAMEY LLP; Daniel J. Krueger

(57)        ABSTRACT

Retimers and retiming methods may employ dual path clock forwarding to drive a transmit clock generator. One illustrative integrate retimer circuit includes: a sampling element configured to produce a digital receive signal by sampling an analog receive signal in accordance with a sampling signal; a timing error estimator configured to produce a timing error signal indicating an estimated timing error of the sampling signal relative to the analog receive signal; a clock recovery circuit configured to derive the sampling signal from the estimated timing error and a reference clock in part by determining a frequency signal; a transmitter configured to retransmit the digital receive signal in accordance with a transmit clock; and a transmit clock generator configured to derive the transmit clock. The transmit clock generator operates based on each of: the reference clock; the frequency signal; and a phase error of the transmit clock relative to the sampling signal.

14 Claims, 9 Drawing Sheets

(56) References Cited

OTHER PUBLICATIONS

Kurt H. Mueller, Markus Muller, Timing Recovery in Digital Synchronous Data Receivers, IEEE Transactions on Communications, May 5, 1976, pp. 516-531, vol. 24.
Faisal A. Musa, High-Speed Baud-Rate Clock Recovery, Graduate Department of Electrical and Computer Engineering University of Toronto, 2008, pp. 1-120, Toronto, Canada.

* cited by examiner

FIG. 1
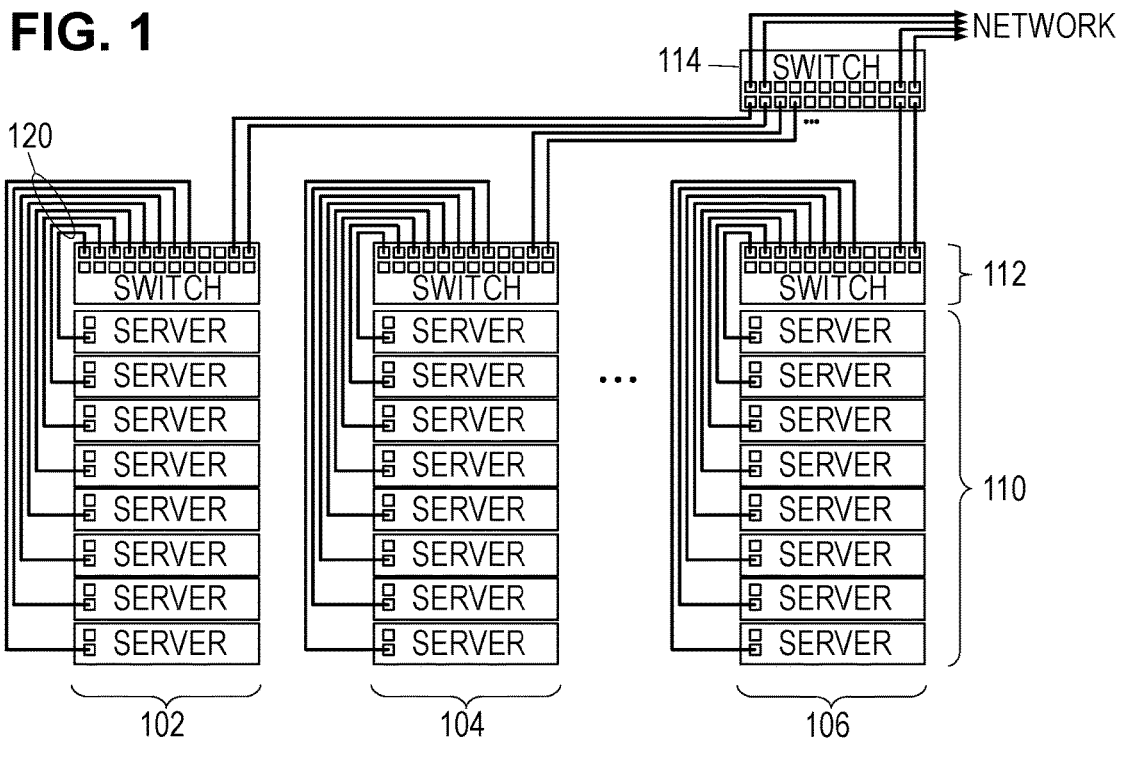
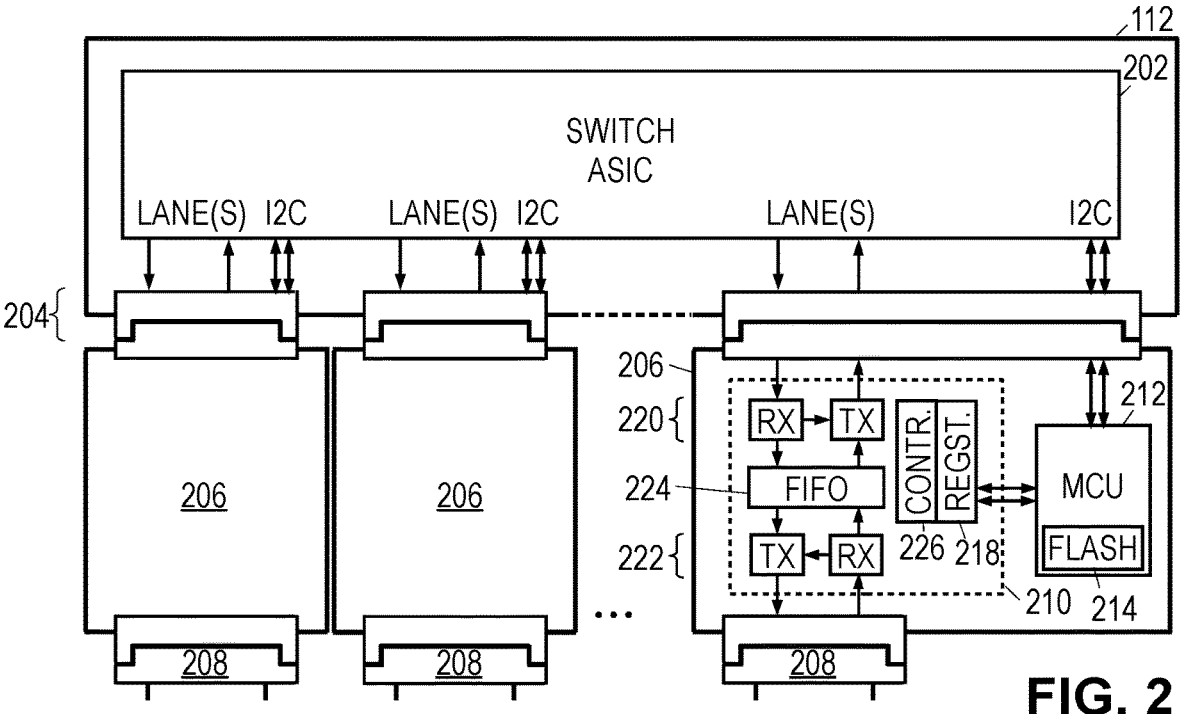
FIG. 2

DUAL PATH CLOCK FORWARDING

TECHNICAL FIELD

The present disclosure relates to digital retimers, and more particularly, to retimers using clock recovery circuits and techniques to drive a transmit clock generator with dual path clock forwarding.

BACKGROUND

As high-speed data streams travel from source to destination, they are often received and re-transmitted to, e.g., combat attenuation, transition between different links, or perhaps traverse intermediate devices. Digital retimers perform such receiving and retransmission using clock recovery, symbol detection, and buffering. Because the buffer memory is limited, the retransmission clock is tied directly or indirectly (e.g., via the buffer fill level) to the recovered receive clock. As a consequence, jitter in the receive clock often causes jitter in the retransmission clock. A careful analysis of the jitter transfer function gain in existing designs reveals peaks that undesirably impair system performance, particularly when combined with transfer function peaking of the clock recovery circuit and/or retransmission clock phase lock loop that may result from process, voltage, and temperature (PVT) variations.

SUMMARY

Accordingly, there are disclosed herein retimers and retiming methods employing dual path clock forwarding to drive a transmit clock generator. One illustrative integrate retimer circuit includes: a sampling element configured to produce a digital receive signal by sampling an analog receive signal in accordance with a sampling signal; a timing error estimator configured to produce a timing error signal indicating an estimated timing error of the sampling signal relative to the analog receive signal; a clock recovery circuit configured to derive the sampling signal from the estimated timing error and a reference clock in part by determining a frequency signal; a transmitter configured to retransmit the digital receive signal in accordance with a transmit clock; and a transmit clock generator configured to derive the transmit clock. The transmit clock generator operates based on each of: the reference clock; the frequency signal; and a phase error of the transmit clock relative to the sampling signal.

An illustrative retiming method includes: sampling an analog receive signal in accordance with a sampling signal to obtain a digital receive signal; producing a timing error signal indicating an estimated timing error of the sampling signal relative to the analog receive signal; deriving the sampling signal from the estimated timing error and a reference clock in part by determining a frequency signal; retransmitting the digital receive signal in accordance with a transmit clock; and deriving the transmit clock based on each of: the reference clock, the frequency signal, and a phase error of the transmit clock relative to the sampling signal.

An illustrative semiconductor intellectual property core generates circuitry for implementing a retimer and/or retiming method as described above.

Each of the foregoing retimer, retiming method, and core implementations may be embodied individually or conjointly and may be combined with any one or more of the following optional features: 1. the transmit clock generator includes a clock forwarding filter having: a phase comparator to determine the phase error; a phase filter coupled to the phase comparator to derive a filtered phase error; and a frequency filter to derive a filtered frequency signal. 2. the frequency signal is a division ratio for a fractional-N phase lock loop in a clock signal path for deriving the sampling signal from the reference clock. 3. the transmit clock generator includes a fractional-N phase lock loop in a clock signal path for deriving the transmit clock from the reference clock. 4. the frequency signal is a frequency offset for a phase interpolator in a clock signal path for deriving the sampling signal from the reference clock. 5. the transmit clock generator includes a phase interpolator in a clock signal path for deriving the transmit clock from the reference clock. 6. the phase filter includes a jitter filter. 7. the phase filter is a second-order filter. 8. the phase error is a difference between a write pointer for a buffer and a read pointer for the buffer. 9. a secondary clock forwarding filter that aligns a secondary transmit clock to said transmit clock.

BRIEF DESCRIPTION OF THE DRAWINGS

FIG. 1 shows an illustrative network.
FIG. 2 is a block diagram of an illustrative switch.

DETAILED DESCRIPTION

Figure 3A:
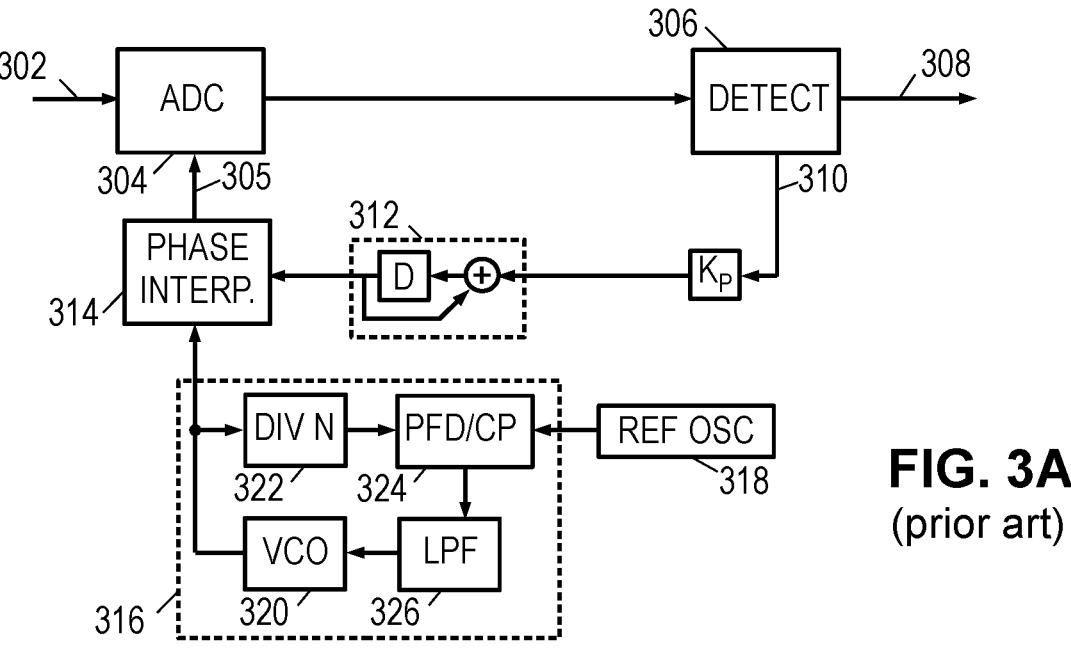
FIGS. 3A-3C are block diagrams of illustrative digital communications receivers having various clock recovery implementations.

While specific embodiments are given in the drawings and the following description, they do not limit the disclosure. On the contrary, they provide the foundation for one of ordinary skill to discern the alternative forms, equivalents, and modifications that are encompassed in the scope of the appended claims.

For context, FIG. 1 shows an illustrative network such as might be found in a data processing center, with multiple server racks 102-106 each containing multiple servers 110 and at least one "top of rack" (TOR) switch 112. The TOR switches 112 are connected to aggregator switches 114 for interconnectivity and connection to the regional network and internet. (As used herein, the term "switch" includes not just traditional network switches, but also routers, network bridges, hubs, and other devices that forward network communication packets between ports.) Each of the servers 110 is connected to the TOR switches 112 by network cables 120, which may convey signals at high symbol rates.

FIG. 2 shows an illustrative switch 112 with an application-specific integrated circuit (ASIC) 202 that implements packet-switching functionality coupled to port connectors 204 for line cards or "pluggable modules" 206. Pluggable modules 206 couple between the port connectors 204 and cable connectors 208 to improve communications performance by way of equalization and optional format conversion (e.g., converting between electrical and optical signals). The pluggable modules 206 may comply with any one of various pluggable module standards including SFP, SFP-DD, QSFP, QSFP-DD, and OSFP. Alternatively, the cables themselves may have connectors that conform to the pluggable module standards and incorporate the pluggable module circuitry.

The pluggable modules 206 may each include a retimer chip 210 and a microcontroller chip 212 that controls operation of the retimer chip 210 in accordance with firmware and parameters that may be stored in nonvolatile memory 214. The operating mode and parameters of the pluggable retimer modules 206 may be set via a two-wire bus such as I2C or MDIO that connects the microcontroller chip 212 to the host device (e.g., switch 112). The microcontroller chip 212 responds to queries and commands received via the two-wire bus, and responsively retrieves information from and saves information to control registers 218 of the retimer chip 210.

Retimer chip 210 includes a host-side transceiver 220 coupled to a line-side transceiver 222 by first-in first-out (FIFO) buffers 224. Though only a single lane is shown in the figure, the transceivers may support multiple lanes conveyed via multiple corresponding optical fibers or electrical conductors. A controller 226 coordinates the operation of the transceivers in accordance with the control register contents and may provide for multiple communication phases pursuant to a communications standard such as the Fibre Channel Standard published by the American National Standard for Information Technology Accredited Standards Committee INCITS, which provides phases for link speed negotiation (LSN), equalizer training, and normal operation.

The receiver portion of each transceiver may employ any of the many equalization and demodulation techniques disclosed in the open literature for recovering digital data from the degraded receive signal even in the presence of ISI. A critical piece of such techniques is a determination of the correct sample timing, as sample timing directly affects the signal to noise ratio of the discrete samples. Strategies for detecting and tracking optimal sample times exist with varying degrees of tradeoff between simplicity and performance, including those disclosed by the present inventors in U.S. Pat. No. 10,892,763, "Second-order clock recovery using three feedback paths", which is hereby incorporated herein in its entirety.

Figure 3B:
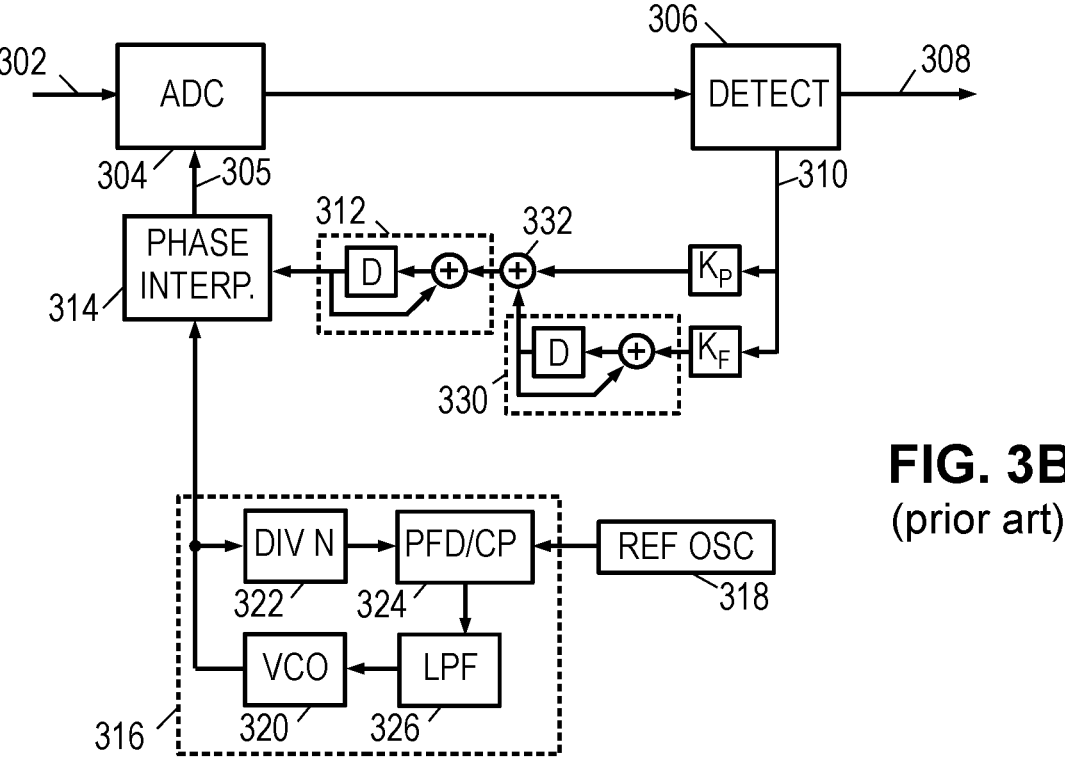
Figure 3C:
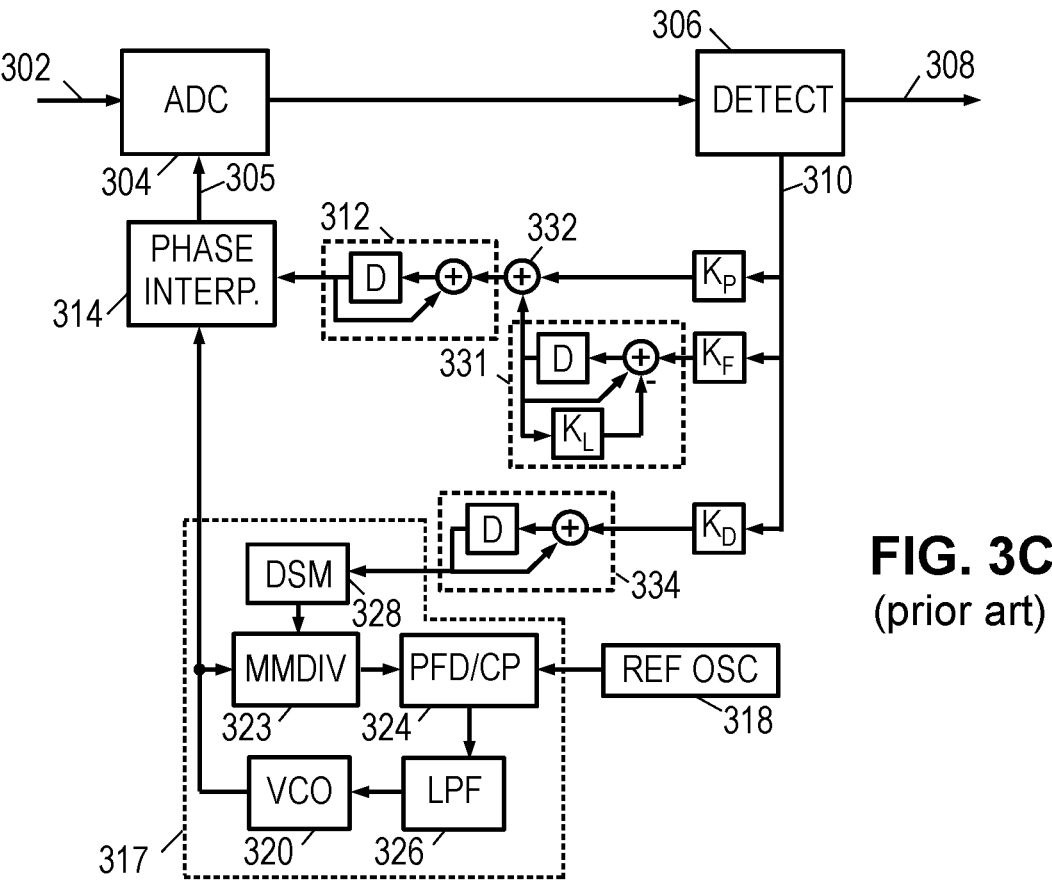

FIGS. 3A-3C show various clock recovery techniques that may be implemented by an illustrative receiver. Each of these receivers include an analog-to-digital converter 304 or other sampling element that samples the analog receive signal 302 at sample times corresponding to transitions in a sampling signal 305, thereby providing a digital receive signal to a detection module 306. The detection module 306 may apply equalization as well as symbol detection using, e.g., a matched filter, a decision feedback equalizer, a maximum likelihood sequence estimator, or any other suitable demodulation technique. The resulting stream of detected symbols 308 may be provided as a parallelized symbol stream for handling by "on-chip" circuitry, e.g., error correction and FIFO buffering.

The detection module 306 includes some form of a timing error estimator to generate an estimated timing error signal 310. Any suitable design may be used for the timing error estimator including, e.g., a bang-bang or proportional phase detector. One suitable timing error estimator is set forth in co-owned U.S. Pat. No. 10,447,509, "Precompensator-based quantization for clock recovery", which is hereby incorporated herein by reference in its entirety. Other suitable timing error estimators can be found in the open literature, including, e.g., Mueller, "Timing Recovery in Digital Synchronous Data Receivers", IEEE Trans. Commun., v24n5, May 1976, and Musa, "High-speed Baud-Rate Clock Recovery", U. Toronto Thesis, 2008.

In FIG. 3A, the timing error signal 310 is coupled via a feedback path to control a phase interpolator 314 in a fashion that statistically minimizes the timing error signal 310. In the feedback path, the timing error signal is scaled by a phase coefficient ($K_P$) and integrated by a phase error accumulator 312 to obtain a phase code signal (supplied as a control signal to the phase interpolator 314). The phase interpolator 314 operates on a clock signal from a phase lock loop (PLL) 316. The phase interpolator 314 may receive or construct different phases of the clock signal, combining the different phases in accordance with the control signal to provide the sampling signal 305 having an interpolated phase more precisely matched to the symbols conveyed by the receive signal 302.

The clock signal produced by phase lock loop (PLL) 316 is a frequency-multiplied version of a reference clock signal from reference oscillator 318. A voltage-controlled oscillator (VCO) 320 supplies the clock signal to both the phase interpolator 314 and to a counter 322 that divides the frequency of the clock signal by a constant modulus N. The counter 322 supplies the divided-frequency clock signal to a phase-frequency detector (PFD) 324. PFD 324 may use a charge pump (CP) as part of determining which input (i.e., the divided-frequency clock signal or the reference clock signal) has transitions earlier or more often than the other. A low pass filter 326 filters the output of PFD 324 to provide a control voltage to VCO 320. The filter parameters are chosen so that the divided frequency clock becomes phase aligned with the reference oscillator.

The phase interpolator 314 is configured to interpolate the phase in discrete steps from 0 to 360°. A 7-bit control signal would enable 128 steps for a phase resolution of ~2.8°. Other resolutions would also be suitable. In any case, the phase error accumulator 312 may be implemented with a higher bit resolution for improved performance, with the control signal being derived using truncation of the least significant bit(s). For various implementation reasons, the 360° interpolation range of the phase interpolator 314 may correspond to multiple symbol intervals, e.g., four, consequently reducing the number of phase increments per unit interval to, e.g., 32. The sub-unit phase may be determined by excluding the most significant bit(s) of the phase interpolator control signal.

For at least some contemplated uses, the reference oscillator 318 used by the receiver will often drift relative to the reference clock used by the transmitter and may differ by hundreds of ppm. To mitigate this issue, the receiver of FIG. 3B includes a second feedback path in which the timing error signal is scaled by a frequency coefficient ($K_F$) and integrated by a frequency error accumulator 330 to obtain a frequency offset signal. A summer 332 adds the frequency offset signal to the scaled timing error signal, supplying the sum to the phase error accumulator 312. The control signal produced by the phase error accumulator 312 compensates for both the frequency offset and phase error of the clock signal relative to the analog receive signal 302, thereby phase-aligning the sampling signal 305 with the data symbols in the analog receive signal 302.

In both FIGS. 3A and 3B, any frequency offset between the PLL's clock signal output and the analog data signal is corrected by a continuous phase rotation of the phase interpolator 314. This mode of operation imposes stringent demands on the linearity of the phase interpolator 314 over its entire tuning range, as the interpolator will repeatedly cycle through each of the phase interpolations during the continuous rotation. Any phase interpolation nonlinearity exhibits as periodic jitter in the sampling signal 305, which becomes particularly exaggerated when the incoming signal employs spread spectrum clocking (SSC) to reduce electromagnetic interference.

The receiver in FIG. 3C employs a third feedback path that may help address this issue. The receiver retains the analog-to-digital converter 304 for sampling the analog receive signal 302 and providing a digital receive signal to the detection module 306. As before, the detection module 306 incudes a timing error estimator that generates a timing error signal 310, and a first feedback path with the phase coefficient ($K_P$) scaling and phase error accumulator 312. In the second feedback path, the frequency error accumulator 330 (FIG. 3B) is replaced with a modified frequency error accumulator 331 that is a leaky integrator that multiplies the accumulated frequency error by $(1-K_L)$ in each integration cycle. The leakage coefficient ($K_L$) represents a gradual memory loss which, while it enables the second feedback path to provide a fast response, causes the frequency offset signal to tend toward zero over longer time scales.

The PLL 316 is replaced with a fractional-N phase lock loop 317 controlled via a third feedback path, enabling any frequency offset to be corrected separately from the phase interpolator 314. The third feedback path includes a division-ratio scaling coefficient ($K_D$) and a division-ratio error accumulator 334, which supplies a division-ratio control signal to the fractional-N phase lock loop 317. The fractional-N phase lock loop 317 is used in place of the original phase lock loop 316 to provide fine-grained frequency control of the clock signal supplied to the phase interpolator 314. The division-ratio control signal adjusts the frequency offset of the clock signal relative to the data in the analog receive signal 302, substantially reducing the phase rotation rate needed from the phase interpolator 314.

A comparison of FIGS. 3B & 3C shows that the phase lock loop 316 and the fractional-N phase lock loop 317 both employ a PFD/CP 324 (comparing a divided frequency clock signal to the reference clock), low pass filter 326 (filtering the error to reduce noise), and a voltage-controlled oscillator 320 (supplying the output clock signal). Rather than dividing the output clock signal with a fixed modulus divider 322, the fractional-N phase lock loop 317 uses a multi-modulus divider 323 that divides by N+m where N is a fixed large integer and m is a varying sign and small-magnitude integer (e.g. 0, +1, −1, +2, −2) given by the modulus selection signal at the end of (or, in alternative embodiments, at the beginning of, or at any point during) a count cycle. A delta-sigma modulator (DSM) 328 converts the division-ratio control signal into the modulus selection signal. The average value of N+m controls what fractional value the divider implements, enabling very fine control of the clock frequency supplied to the interpolator 314.

The division-ratio error accumulator 334, in combination with the low pass filter 326 of the phase lock loop 317, operates on the longer time scale to overcome the memory loss of the modified accumulator 331. Under steady-state or slow-changing conditions, the frequency offset correction is provided by the third feedback path, minimizing any effect of the phase interpolator nonlinearities. Where conditions where the frequency offset changes more quickly, the more transient corrections are provided by the first and second feedback paths.

Yet another illustrative implementation of the receiver omits the frequency error accumulator 331 of FIG. 3C and relies solely on the division-error ratio accumulator 334 to correct any frequency offset. This additional implementation can be understood as setting the frequency coefficient $K_F$ to zero in FIG. 3C.

Note that the frequency offset signals provided by accumulator 330 and the division ratio control signal provided by accumulator 334 may each qualify as a frequency signal as that term is used in the claims. Though expressed in different forms and determined relative to the reference oscillator frequency, they each represent a determination of the symbol frequency in the receive signal.

Figure 4:
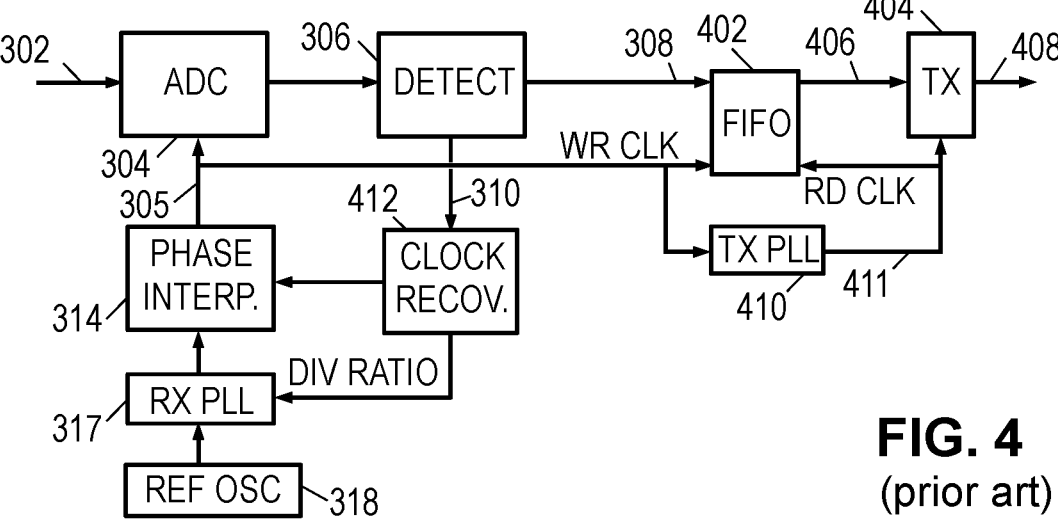
FIG. 4 is a block diagram of an illustrative digital retimer with clock forwarding.

FIG. 4 shows an illustrative retimer that combines the receiver design of FIG. 3C with a buffer 402 and transmitter 404. Buffer 402 stores detected symbols 308 in a first-in first-out (FIFO) fashion. Transmitter 404 retrieves the buffered symbol stream 406 and retransmits it as an outgoing data stream 408. A PLL 410 provides a transmit clock 411 to the transmitter 404 to control the symbol timing in the outgoing data stream 408. The FIFO may accept sample clock 305 as a write clock for storing detected symbols 308 and may accept transmit clock 411 as a read clock for providing buffered symbols to the transmitter 404. Clock recovery module 412 represents the filters and feedback path(s) circuitry that determines a frequency signal as part of converting the phase error signal 310 into a phase control signal for interpolator 314 and an optional division ratio control signal for PLL 317.

The PLL 410 derives the transmit clock from the sample clock signal 305 and is adversely affected by jitter in the sample clock signal. It is desired to minimize jitter in the outgoing data stream without unduly increasing complexity, cost, or susceptibility to PVT variations.

Figure 5:
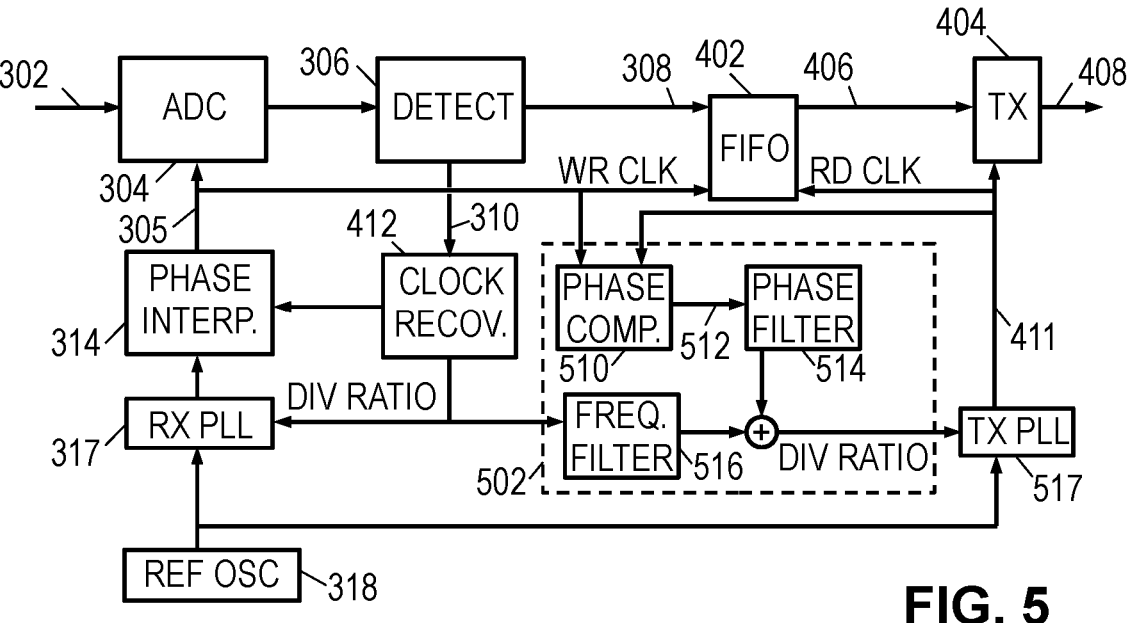
FIG. 5 is a block diagram of an illustrative digital retimer with dual path clock forwarding.

FIG. 5 is a block diagram of an illustrative digital retimer that implements a retiming method with dual path clock forwarding filter 502 supplying a division ratio control signal to a transmit PLL 517. Using the division ratio control signal, the transmit PLL 517 derives the transmit clock 411 from a reference clock supplied by reference oscillator 318. Transmit PLL 517 may be implemented in a similar fashion as receive PLL 317 (FIG. 3C).

Clock forwarding filter 502 includes a phase comparator 510 that compares the sampling clock 305 (supplied as a write clock to FIFO buffer 402) with the transmit clock 411 (supplied as a read clock to FIFO buffer 402) to derive a phase error signal 512. The comparator 510 may use phase-frequency detector design or another suitable phase comparator technique. A phase filter 514 operates on the phase error signal to produce a filtered phase error signal that statistically minimizes variation of the phase error signal. Clock forwarding filter 502 is a dual path filter that also includes a frequency filter 516. The frequency filter 516 operates on a frequency signal from the clock recovery module 412 to produce a filtered frequency signal. A summer sums the filtered phase error signal with the filtered frequency signal to produce the division ratio control signal.

The frequency signal used by the frequency filter 516 in this case is the division ratio control signal for receiver PLL 317.

Figure 6:
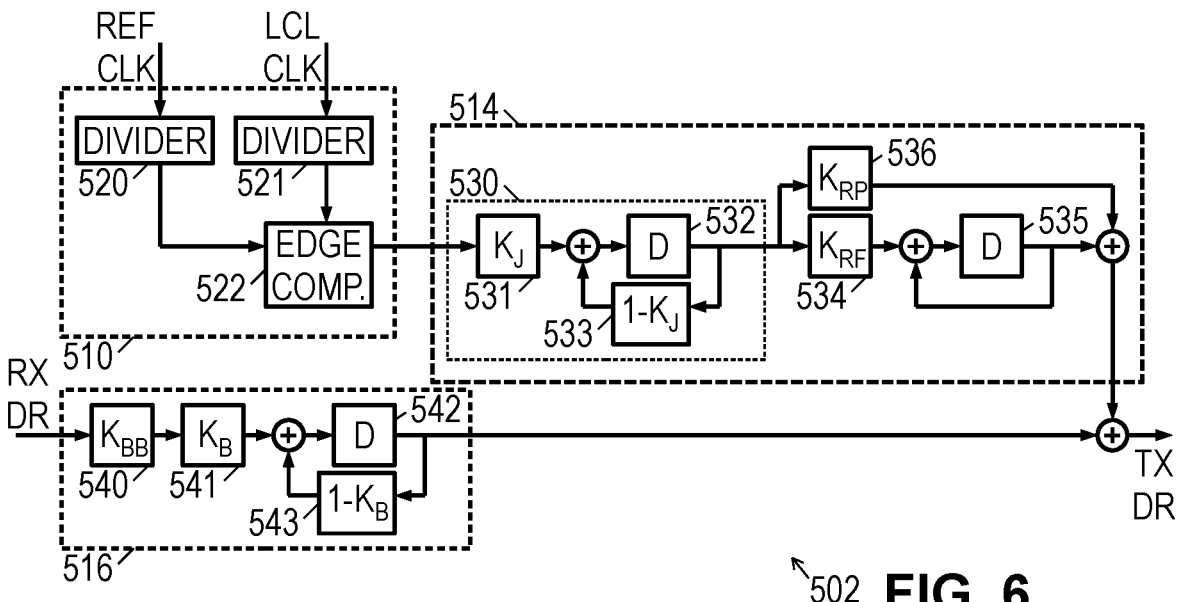
FIG. 6 is a block diagram of a first illustrative dual path forwarding filter implementation.

Clock forwarding filter 502 may have the illustrative implementation shown in FIG. 6. Phase comparator 510 includes a counter/frequency divider 520 for the reference clock (e.g., sampling clock 305) and a second counter/ frequency divider 521 for the local clock (e.g., transmit clock 411), each operating to reduce the clock frequency by a given modulus N. An edge comparator 522 compares transitions of the divided clocks to determine whether the phase error is positive or negative, and optionally to also determine a magnitude of the phase error. Phase filter 514 includes a jitter filter 530, shown here as an IIR filter that scales a current phase error by a jitter coefficient $K_J$ 531 and scales an accumulated value from register 532 by a coefficient 533 that equals $1-K_J$. The scaled values are summed and stored in the register 532 for the next clock cycle. The phase filter 514 further includes a frequency coefficient $K_{RF}$ 534 that scales the accumulated value from register 532 before summing it with a frequency offset from register 535. The summed value is accumulated in register 535. A phase coefficient $K_{RP}$ 536 scales the accumulated value from register 532 before summing it with the frequency offset from register 535, producing a filtered phase error signal. The combination of the jitter filter 530 and the frequency offset accumulator (register 535) make the phase filter 514 a second-order filter.

The frequency filter 516 is shown having a broadband gain coefficient $K_{BB}$ 540 and a bandwidth coefficient $K_B$ that scale the frequency signal (shown here as the receive PLL division ratio) before it is summed with an accumulated value from register 542 scaled by a coefficient $(1-K_B)$ 543. The sum is stored as an accumulated value in register 542. The accumulated value in register 542 is provided as a filtered frequency signal to a summer that adds the filtered frequency signal to the filtered phase signal, producing a frequency control signal (shown here as the transmit PLL division ratio).

Figure 7:
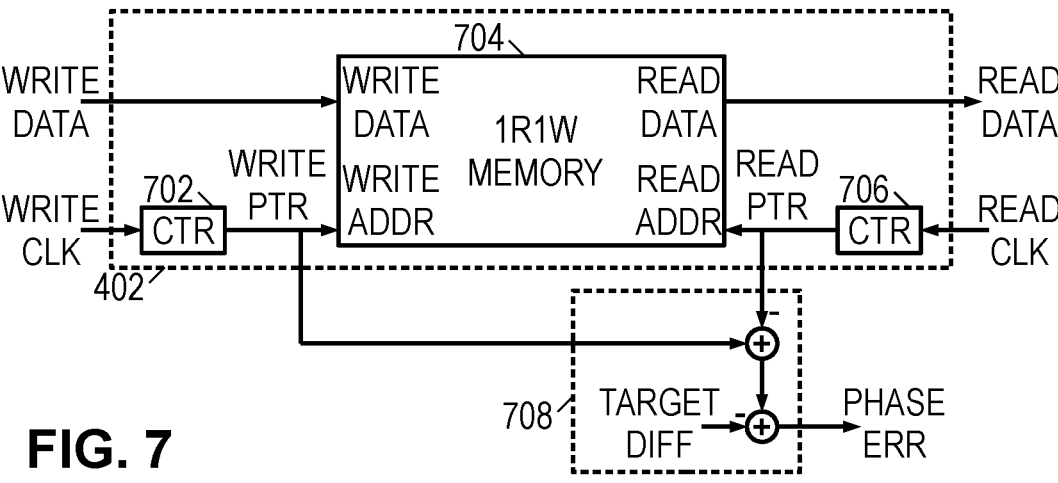
FIG. 7 shows an alternative phase comparator implementation.

FIGS. 5 and 6 merely show one illustrative implementation. As an example of an alternative implementation, the phase error signal 512 determined by phase comparator 510 can instead be determined as shown in FIG. 7. FIG. 7 shows an illustrative implementation of FIFO buffer 402 having a counter 702 that converts the write clock into a write address pointer for a memory 704 having independent read and write ports. The memory stores the write data at the memory address indicated by the write address pointer. Another counter 706 converts the read clock into a read address pointer for the memory 704, causing the data stored at the indicated read address to be provided for reading. A calculation circuit 708 subtracts the read address pointer from the write address pointer to determine the number of symbols stored in the memory 704. (To address counter rollovers, a rollover flag may be set when the write counter rolls over and reset when the read counter rolls over. The subtraction element may treat the rollover flag as an extra bit for the write address pointer.) The calculation circuit may then subtract a target value from the number of stored symbols, providing the difference as the phase error signal 512.

Figure 8:
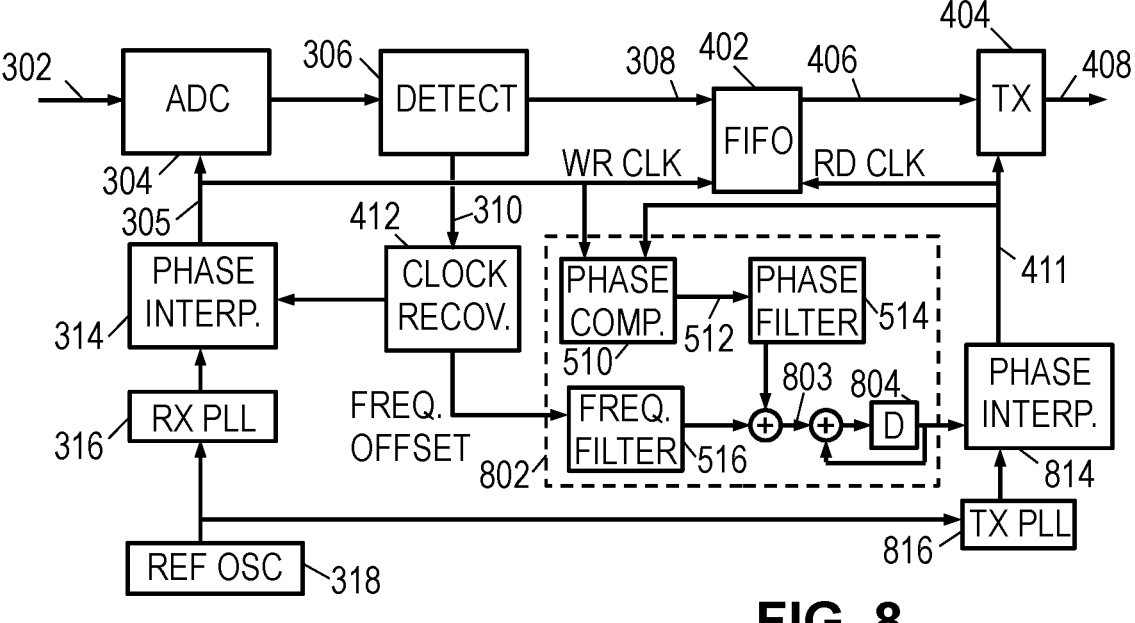
FIG. 8 is a block diagram of a second illustrative dual path clock forwarding filter implementation.

Other dual path clock forwarding filter implementations are also contemplated. FIG. 8 shows an illustrative retimer implementation in which the clock recovery module 412 determines a frequency offset rather than a PLL division ratio. (Referring momentarily to FIG. 3B, this frequency offset may be provided by accumulator 330.) The clock forwarding filter 802 includes the phase comparator 510, phase filter 514, and frequency filter 516 described previously in reference to FIG. 5, though the frequency filter 516 operates on the frequency offset from clock recovery module 412. A summer adds the filtered frequency signal from the frequency filter 516 to the filtered phase signal from phase filter 514 to obtain a phase offset signal 803. A phase accumulator 804 may be provided as part of the clock forwarding filter 802 to derive a phase control signal for the transmit clock phase interpolator 814. A transmit PLL 816 supplies a frequency-multiplied version of the reference clock signal from reference oscillator 318 to the transmit clock phase interpolator 814. Based on the phase control signal, the transmit clock phase interpolator 814 derives the transmit clock 411 from the frequency-multiplied clock signal.

Figure 9:
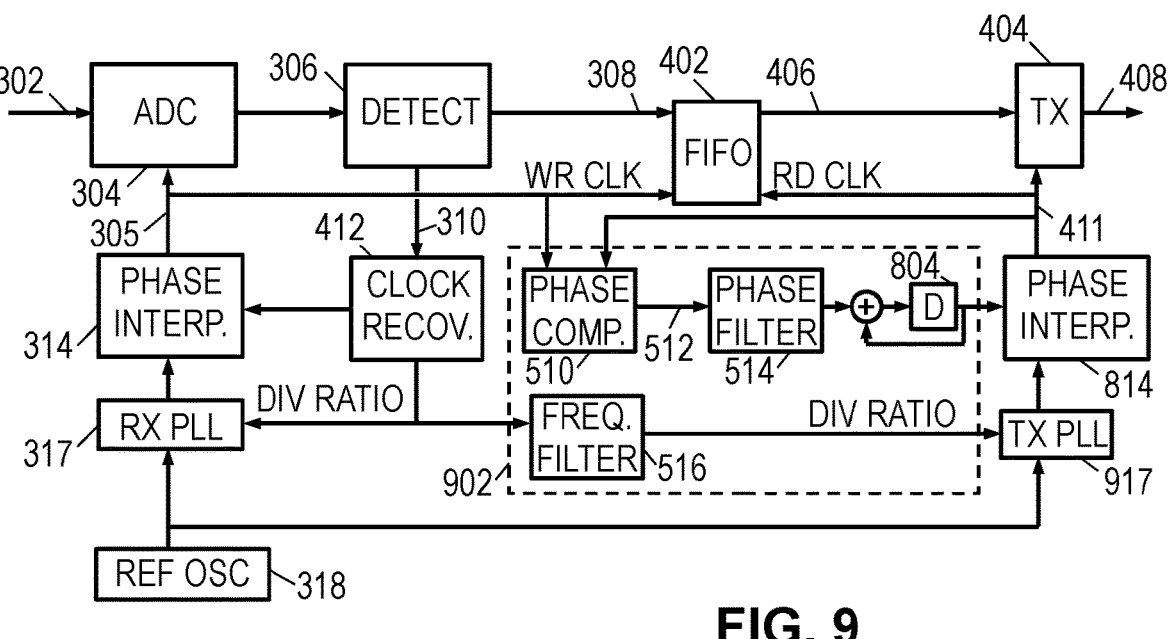
FIG. 9 is a block diagram of a third illustrative dual path clock forwarding filter implementation.

FIG. 9 shows another illustrative retimer implementation. As contrasted with the implementations of FIGS. 5 and 8, the clock forwarding filter 902 supplies control signals to both the transmit PLL 917 and to the transmit clock phase interpolator 814. The phase comparator 510, phase filter 514, and phase accumulator 804 derive a phase control signal for the transmit clock phase interpolator 814 from the phase relationship between the read and write clocks of FIFO 402. The frequency filter 516 operates on the division ratio signal from clock recovery module 412 to obtain a filtered division ratio signal. The clock forwarding filter 902 provides the filtered division ratio signal to the transmit PLL 917.

Figure 10:
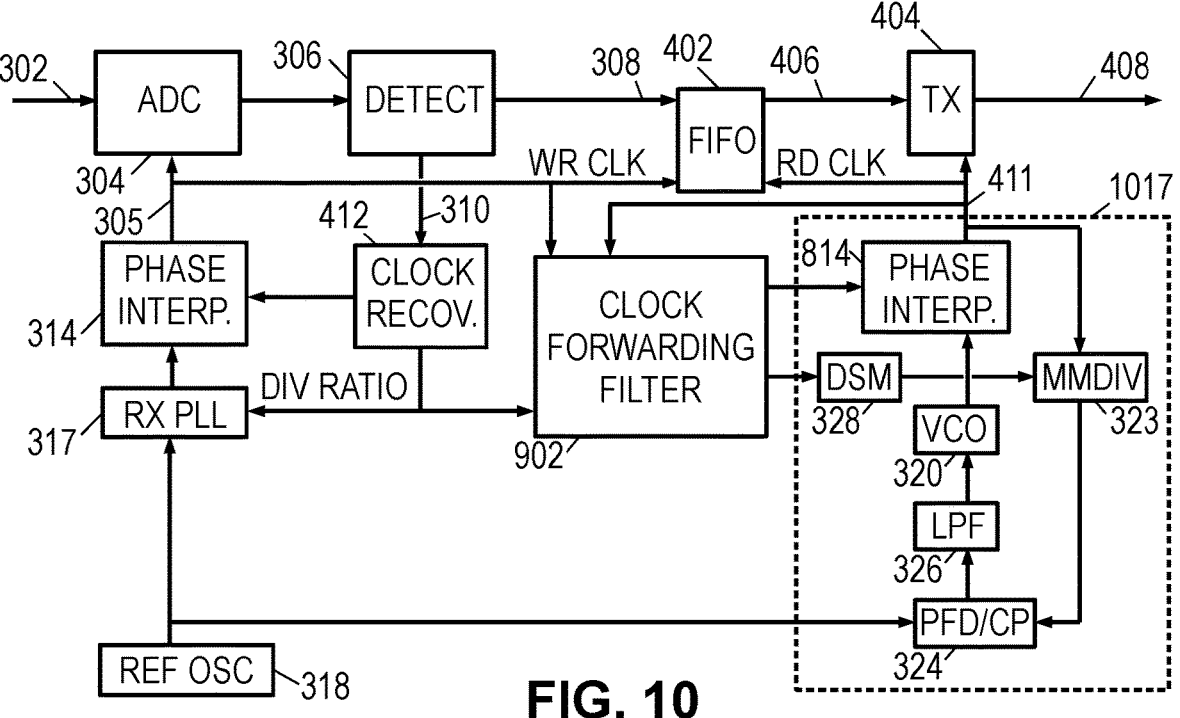
FIG. 10 shows an alternative implementation of the transmit phase lock loop.

The illustrative retimer implementation of FIG. 10 is similar to that of FIG. 9, but the transmit PLL 1017 has been modified to include the transmit clock phase interpolator 814 within the transmit PLL feedback loop. As with the fractional-N phase lock loop 317 (FIG. 3C), the multi-modulus divider 323 frequency divides the transmit clock 411 by N+m where m is a varying sign and small-magnitude integer of the modulus selection signal at the end of (or, in alternative embodiments, at the beginning of, or at any point during) a count cycle. A delta-sigma modulator (DSM) 328 converts the division-ratio control signal into the modulus selection signal. The average of N+m controls what fractional value the divider implements, enabling very fine control of the transmit clock frequency. With the transmit clock phase interpolator 814 included, the transmit PLL feedback loop can mitigate the effects of any phase interpolation nonlinearities.

The foregoing retimer implementations are illustrated as single channel retimers. Multichannel systems can be implemented with multiple versions of the illustrated retimers arranged in parallel. While it is possible to operate the multiple retimers independently, such operation may permit undesirable levels of channel skew. To limit such channel skew, multichannel retimers may designate one channel as the primary channel and align the transmit clocks of all secondary channels with that of the primary channel.

Figure 11:
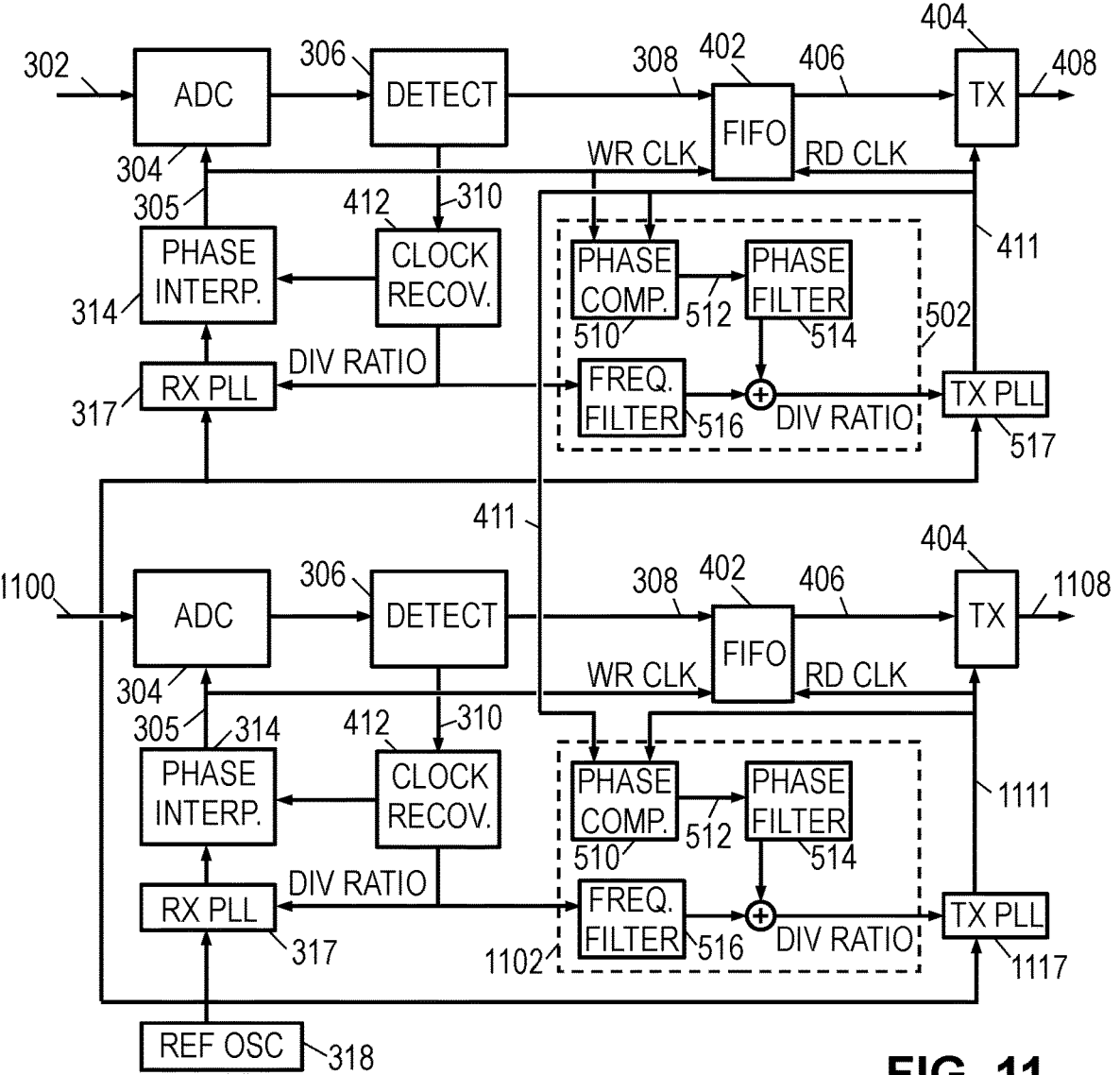
FIG. 11 shows the first illustrative dual path forwarding filter in a multi-channel retimer.

FIG. 11 shows an illustrative multichannel retimer implementation that corresponds to the single channel implementation of FIG. 5. The receive signal 302 and corresponding outgoing data stream 408 may be designated as the primary channel and handled as discussed previously with respect to FIG. 5. Another receive signal 1100 and outgoing data stream 1108 may be designated as a secondary channel. A secondary clock forwarding filter 1102 provides a division ratio control signal to a secondary transmit PLL 1117, which supplies a secondary transmit clock 1111 for the outgoing data stream 1108. The secondary clock forwarding filter 1102 is distinguished from the primary clock forwarding filter 502 only in that the phase comparator 510 determines a phase error between the primary and secondary transmit clocks 411, 1111, rather than between the write and read clocks of the FIFO buffer 402. This enables the multichannel retimer to statistically align the primary and secondary transmit clocks without forcing a rigid duplication.

Figure 12:
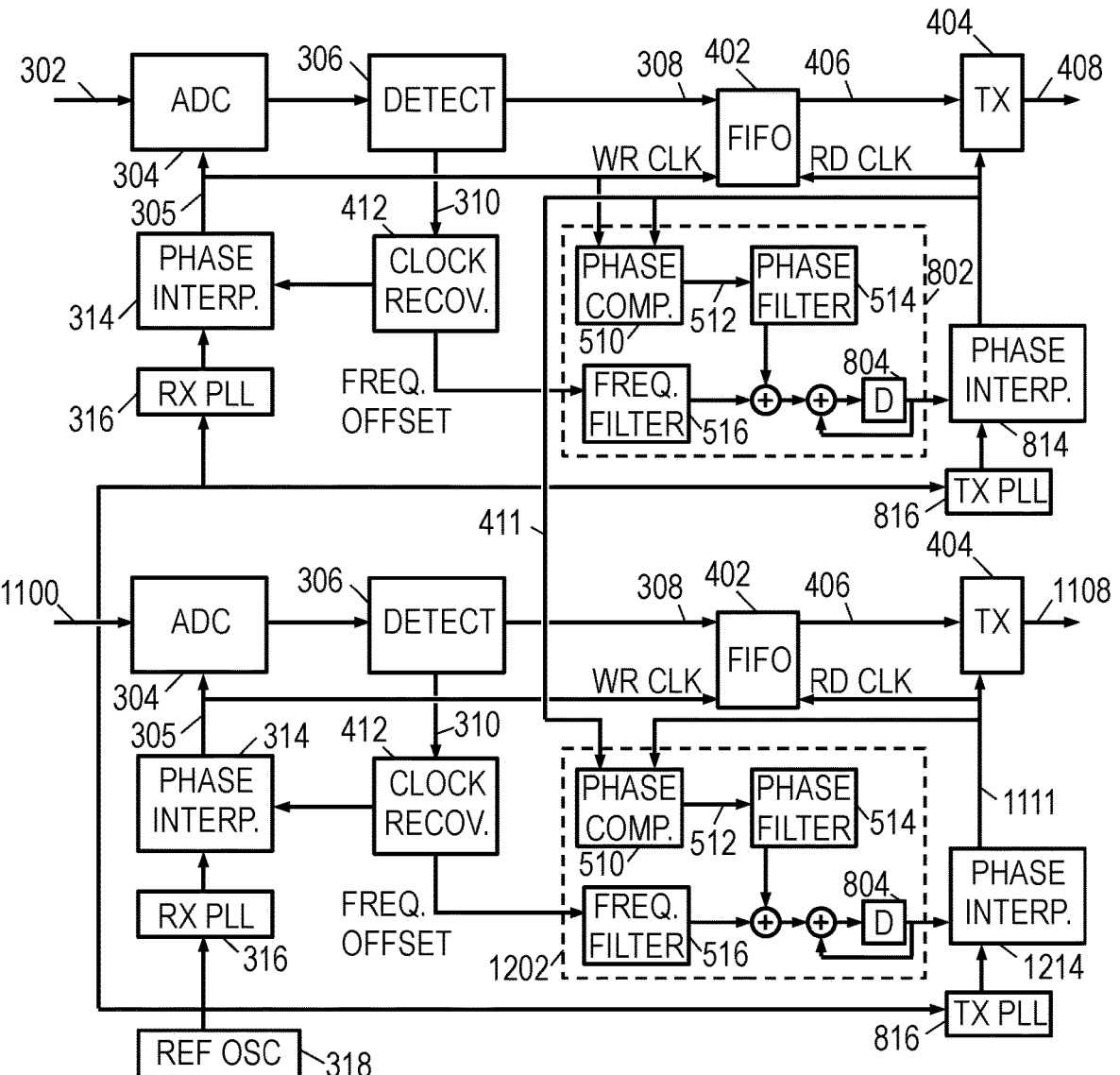
FIG. 12 shows the second illustrative dual path forwarding filter in a multi-channel retimer.

FIG. 12 shows an illustrative multichannel retimer implementation that corresponds to the single channel implementation of FIG. 8. The receive signal 302 and corresponding outgoing data stream 408 may be designated as the primary channel and handled as discussed previously with respect to FIG. 8. Another receive signal 1100 and outgoing data stream 1108 may be designated as a secondary channel. A secondary clock forwarding filter 1202 provides a phase control signal to secondary transmit clock phase interpolator 1214, which supplies a secondary transmit clock 1111 for the outgoing data stream 1108. The secondary clock forwarding filter 1202 is distinguished from the primary clock forwarding filter 802 only in that the phase comparator 510 determines a phase error between the primary and secondary transmit clocks 411, 1111, rather than between the write and read clocks of the FIFO buffer 402.

Figure 13:
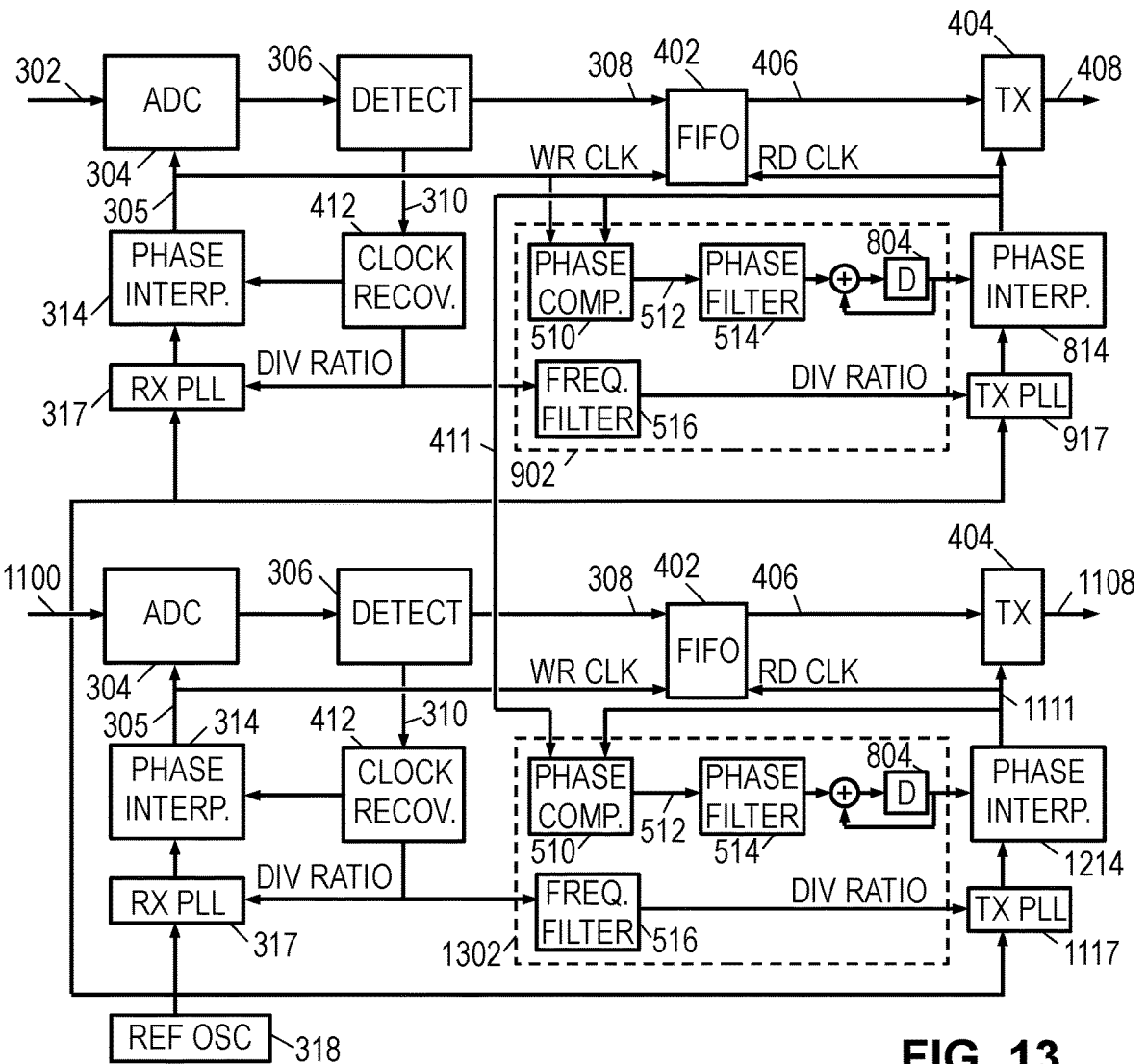
FIG. 13 shows the third illustrative dual path forwarding filter in a multi-channel retimer.

FIG. 13 shows an illustrative multichannel retimer implementation that corresponds to the single channel implementation of FIG. 9. The receive signal 302 and corresponding outgoing data stream 408 may be designated as the primary channel and handled as discussed previously with respect to FIG. 9. Another receive signal 1100 and outgoing data stream 1108 may be designated as a secondary channel. A secondary clock forwarding filter 1302 provides a division ratio control signal to secondary transmit PLL 1117 and a phase control signal to secondary transmit clock phase interpolator 1214. Together transmit PLL 1117 and transmit clock phase interpolator 1214 produce a secondary transmit clock 1111 for the outgoing data stream 1108. The secondary clock forwarding filter 1302 is distinguished from the primary clock forwarding filter 902 only in that the phase comparator 510 determines a phase error between the primary and secondary transmit clocks 411, 1111, rather than between the write and read clocks of the FIFO buffer 402.

The foregoing integrated retimer circuits would typically be created using masks for patterning layers on semiconductor substrates during an integrated circuit manufacturing process. The mask patterns can be generated using commercially available software for converting the circuit schematics (usually expressed using a hardware description language such as Verilog) into semiconductor process masks. The circuits may be sub-units of more complex integrated circuit devices whose designs have been built up from modular components in a design database which resides on a nontransient information storage medium. Once the circuits are fully designed, software may convert the integrated circuits into semiconductor mask patterns also stored on a nontransient information storage medium and conveyed to the various process units in a suitable assembly line of an integrated circuit manufactory.

To facilitate the use of the disclosed retimers and retiming methods employing dual path clock forwarding filters, electronic device designers may express them as predefined modular units of integrated circuit layout designs. The designers can then arrange and join the modular units as needed to implement the various functions of the desired device. Each modular unit has a defined interface and behavior that has been verified by its creator. Though each modular unit may take a lot of time and investment to create, its availability for re-use and further development cuts product cycle times dramatically and enables better products. The predefined units can be organized hierarchically, with a given unit incorporating one or more lower-level units and in turn being incorporated within higher-level units. Many organizations have libraries of such predefined modular units for sale or license, including, e.g., embedded processors, memory, interfaces for different bus standards, power converters, frequency multipliers, sensor transducer interfaces, to name just a few. The predefined modular units are also known as cells, blocks, cores, and macros, terms which have different connotations and variations ("IP core", "soft macro") but are frequently employed interchangeably.

The modular units can be expressed in different ways, e.g., in the form of a hardware description language (HDL) file, or as a fully routed design that could be printed directly to a series of manufacturing process masks. Fully routed design files are typically process-specific, meaning that additional design effort would usually be needed to migrate the modular unit to a different process or manufacturer. Modular units in HDL form require subsequent synthesis, placement, and routing steps for implementation, but are process-independent, meaning that different manufacturers can apply their preferred automated synthesis, placement, and routing processes to implement the units using a wide range of manufacturing processes. By virtue of their higher-level representation, HDL units may be more amenable to modification and the use of variable design parameters, whereas fully routed units may offer better predictability in terms of areal requirements, reliability, and performance. While there is no fixed rule, digital module designs are more commonly specified in HDL form, while analog and mixed-signal units are more commonly specified as a lower-level, physical description.

Numerous alternative forms, equivalents, and modifications will become apparent to those skilled in the art once the above disclosure is fully appreciated. For example, the integration-based accumulators described herein can be replaced with other recursive or moving-average filter implementations providing a low-pass filter response. It is intended that the claims be interpreted to embrace all such alternative forms, equivalents, and modifications that are encompassed in the scope of the appended claims.

What is claimed is:

1. An integrated retimer circuit that comprises:
a sampling element configured to produce a digital receive signal by sampling an analog receive signal in accordance with a sampling signal;
a timing error estimator configured to produce a timing error signal indicating an estimated timing error of the sampling signal relative to the analog receive signal;
a clock recovery circuit configured to derive the sampling signal from the estimated timing error and a reference clock in part by determining a frequency signal;
a transmitter configured to retransmit the digital receive signal in accordance with a transmit clock; and
a transmit clock generator configured to derive the transmit clock based on each of:
the reference clock;
the frequency signal; and
a phase error of the transmit clock relative to the sampling signal,
wherein the transmit clock generator includes a clock forwarding filter having:
a phase comparator to determine the phase error;
a phase filter coupled to the phase comparator to derive a filtered phase error; and
a frequency filter to derive a filtered frequency signal.

2. The integrated retimer circuit of claim 1, wherein the frequency signal is a division ratio for a fractional-N phase lock loop in a clock signal path for deriving the sampling signal from the reference clock, and wherein the transmit clock generator includes a fractional-N phase lock loop in a clock signal path for deriving the transmit clock from the reference clock.

3. The integrated retimer circuit of claim 1, wherein the frequency signal is a frequency offset for a phase interpolator in a clock signal path for deriving the sampling signal from the reference clock, and wherein the transmit clock generator includes a phase interpolator in a clock signal path for deriving the transmit clock from the reference clock.

4. The integrated retimer circuit of claim 3, wherein the clock signal path for deriving the sampling signal includes a fractional-N phase lock loop configured to receive a division ratio from the clock recovery circuit, and wherein the transmit clock generator includes division ratio filter configured to provide a filtered division ratio to a fractional-N phase lock loop in the clock signal path for deriving the transmit clock.

5. The integrated retimer circuit of claim 1, wherein the phase filter includes a jitter filter.

6. The integrated retimer circuit of claim 5, wherein the phase filter is a second-order filter.

7. The integrated retimer circuit of claim 1, wherein the phase error is based on a difference between a write pointer for a buffer and a read pointer for the buffer.

8. The integrated retimer circuit of claim 1, further comprising a secondary clock forwarding filter that aligns a secondary transmit clock to said transmit clock.

9. A retiming method that comprises:
sampling an analog receive signal in accordance with a sampling signal to obtain a digital receive signal;
producing a timing error signal indicating an estimated timing error of the sampling signal relative to the analog receive signal;

12 deriving the sampling signal from the estimated timing error and a reference clock in part by determining a frequency signal;
retransmitting the digital receive signal in accordance with a transmit clock; and
using a transmit clock generator to derive the transmit clock based on each of: the reference clock, the frequency signal, and a phase error of the transmit clock relative to the sampling signal, the transmit clock generator including a clock forwarding filter having:
a phase comparator to determine the phase error;
a phase filter coupled to the phase comparator to derive a filtered phase error; and
a frequency filter to derive a filtered frequency signal.

10. The retiming method of claim 9, wherein the frequency signal is a division ratio for a fractional-N phase lock loop in a clock signal path for deriving the sampling signal from the reference clock, and wherein the transmit clock generator includes a fractional-N phase lock loop in a clock signal path for deriving the transmit clock from the reference clock.

11. The retiming method of claim 9, wherein the frequency signal is a frequency offset for a phase interpolator in a clock signal path for deriving the sampling signal from the reference clock, and wherein the transmit clock generator includes a phase interpolator in a clock signal path for deriving the transmit clock from the reference clock.

12. The retiming method of claim 9, wherein the phase filter includes a jitter filter.

13. The retiming method of claim 12, wherein the phase filter is a second-order filter.

14. The retiming method of claim 9, wherein the phase error is based on a difference between a write address pointer for a buffer and a read address pointer for the buffer.

* * * * *